July 18, 1933.  M. LASSINSKY  1,918,475
VEHICLE DOOR
Filed Jan. 12, 1931
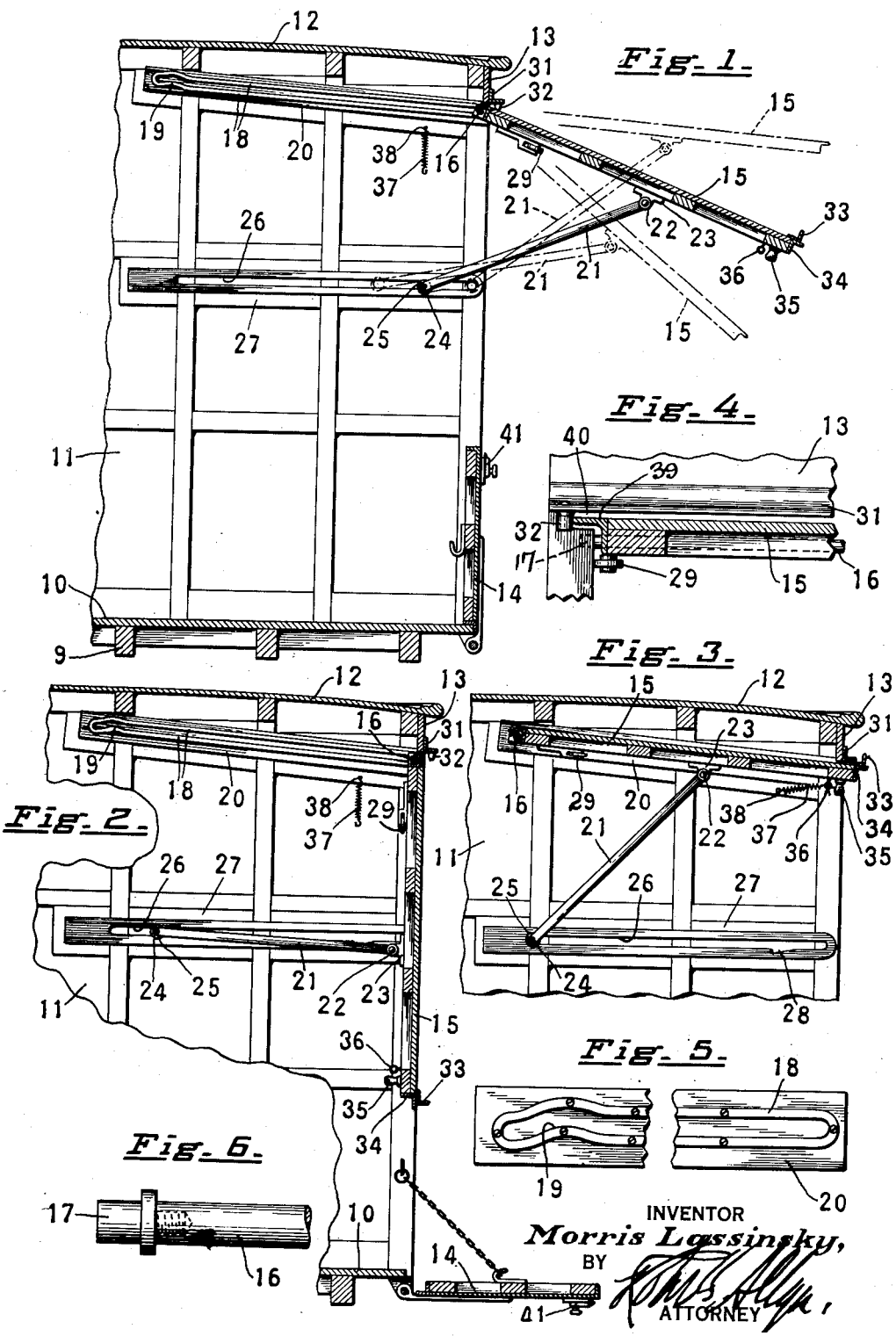
INVENTOR
Morris Lassinsky,
BY
ATTORNEY Patented July 18, 1933

1,918,475

UNITED STATES PATENT OFFICE

MORRIS LASSINSKY, OF BROOKLYN, NEW YORK

VEHICLE DOOR

Application filed January 12, 1931. Serial No. 508,050.

My invention relates to improvements in vehicles having box bodies such as vans, delivery trucks and the like.

One object of this invention is to provide a door which can be opened outward and then pushed back into the truck body out of the way.

A further object is to provide such a door which will occupy a minimum amount of space when in its retracted position and thus permit maximum utilization of the space for lading.

Another object is to provide such a door which will shed rain or snow when closed.

Another object is to provide a support for the door in an intermediate position so that it will serve as weather protection for the lading and for persons standing on the ground at the rear of the truck.

Another object is to provide a construction which is easy to operate.

Other objects and advantages will appear as the specification proceeds.

It has long been customary to provide outwardly swinging doors hinged at the top on the rear ends of box body type delivery trucks. Usually these doors form the closure for the upper portion of the end opening and the lower portion is closed by some form of tailboard.

When these upper doors are swung outward and held in an inclined position by braces they extend to the rear and form a weather protection for the goods as well as the vender when he stands on the ground, but when the trucks are at loading platforms these extending doors prevent ready access to the interior of the truck bodies and obstruct the passage of persons along the platforms and constitute a serious hazard to bypassers.

Doors equipped in accordance with my invention can be used in the partly opened position when desired and pushed out of the way when at loading platforms.

In the preferred form illustrated the door is shown applied to the rear of a delivery truck body, with an outwardly and downwardly swinging tailboard.

The door is suspended on horizontal pins at the upper corners which can move along tracks on either side of the truck body near the top. These tracks are preferably slightly inclined toward the rear and are closed at their back ends to form bearings for the pins when the door is closed and while it is being swung outward.

On the inside of the door near one side is hinged a brace, the other end of which travels in a horizontal track fastened to the inside of the truck body side. At a suitable point in this track there is a notch in which the travelling end of the brace rests when the door is used in its partly opened position. In the form as shown when the tailboard is closed the door may be rasied by swinging on the pins until the brace drops into the track notch and is then ready for use when the attendant is standing on the ground, or it can be raised further until the plane of the door coincides with the plane of the upper sloping tracks and then pushed forward along the tracks into the upper part of the body. During this movement the travelling end of the brace slides forward along its track, requiring momentary manual operation as it passes the notch to keep it from lodging therein.

As the door is fully retracted the pins pass over slight rises or humps near the upper ends of the inclined tracks which serve to prevent them from sliding back down the inclines until a certain amount of manual force is applied to cause them to repass rearwardly over the humps.

A spring hook is also provided for holding the door open while driving as may be desired for proper ventilation in hot weather.

Suitable water shed flanges are provided at the sides and top of the door and tailboard openings so that the contents of the truck body will be kept dry in wet weather.

Fig. 1 is a longitudinal section of the rear end of a delivery truck body equipped with a rear door embodying my invention showing the tailboard up and the door in one raised position with other operating positions indicated in dotted lines.

Fig. 2 is similar to Fig. 1 showing the door closed and the tailboard lowered.

Fig. 3 is a similar longitudinal section showing the door in fully open and retracted position.

Fig. 4 is a rear view of the upper left corner of the door, showing lateral guiding means.

Fig. 5 is a side view of the door hanger track with the central portion broken out.

Fig. 6 is an enlarged view of one of the door hanger pins attached to the door hanger rod.

In the figures shown, 9 is the truck frame on which is carried the truck body having a floor 10, sides 11 and roof 12. At the top of the rear end just below the roof is the fixed facia board 13 with its bottom edge forming the top of the rear end opening of the truck body. The bottom of this opening is formed by the rear end of the floor 10 and its sides are the rear corner posts of the sides 11.

The lower portion of this opening is covered by the tailboard 14 and the upper portion by the door 15 when they are in closed position.

Across the top of the door is a horizontal door hanger rod 16 in the opposite ends of which are screwed collared door hanger pins 17, as shown in detail in Fig. 6.

These pins fit into upwardly inclined hanger pin tracks 18 which extend from points just inside the top of the door opening forward along the truck body sides and have humps 19 raised in them near their upper ends with spaces beyond these humps large enough to receive the hinge pins 17. These tracks are secured to supports 20 which are carried on the truck body sides 11.

At one side of the inner face of the door is secured one end of the brace 21 by means of the brace hinge 22 carried by the hinge support 23 fastened to the door. The other end of the brace is formed with an outward extension or lug 24 on which are guide collars or washers 25, one mounted on each side of the horizontal slotted track 26, which extends longitudinally along the adjacent truck body side 11 to which it is secured by the support 27. At a suitable point in the upper edge of the lower bar of the track 26 is a notch 28 adapted to receive the lug 24 to hold it against a forward thrust and to allow it to slide out when pulled rearwardly.

At each of the upper corners of the door are located lateral guide wheels 29 free to turn in a plane parallel with that of the door surface carried on brackets 30 fastened to the inner face of the door so that the cylindrical faces of the guide wheels are each tangential to one of the inside faces of the inclined tracks 18 on either side.

The top edge of the door is suitably beveled to allow it to clear the lower edge of the facia board 13 and the horizontal shelf 31 is provided to prevent water from entering over this bevel when the door is closed.

Attached to this shelf on either side of the door opening are outside lateral door guide wheels 32 mounted on vertical spindles and having the upper part of their guiding surfaces in the form of inverted frustrums of cones with the lower parts of these surfaces cylindrical, as shown in Fig. 4.

Across the bottom of the outside of the door is another horizontally extending shelf 33 to prevent water from running under the bottom of the door over the top edge of the tailboard 14 when the door is closed. This shelf also acts as an eave when the door is in its partially raised position to carry water from the door surface to the sides instead of allowing it to run off onto persons standing on the ground. When the door is fully retracted water dripping from the shelf 31 is caught by this shelf 33 and carried to the sides of the door opening to prevent dripping over it.

The bottom of the door also has a vertical downwardly projecting stop plate 34 secured to the outside face of the door to cover the joint at the upper edge of the tailboard 14 when both are closed.

A handle 35 is provided for easier manipulation of the door, and an eye bolt 36 is secured to the inside of the door near the lower right corner to receive the hook end of the spring 37 when the door is retracted and anchored at 38 to the adjacent side of the truck body.

On each side of the door panel there are guide flanges 39 which serve as weather protection for the side joints of the door opening when the door is closed and bear against the lateral guide rollers 32 while the door is being moved in or out of the truck body along the inclined tracks 18. Passages 40 are formed in the door side posts at the top which will permit these guide flanges to pass into the truck body when the door has been raised to its highest position.

The latch 41 serves to hold the door and tailboard in their closed positions.

In operation, when it is desired to gain access to the interior of the truck from the ground, the latch 41 is opened and the door 15 is swung outward and upward about the hinge pins 17. The brace lug 24, guided by the collars 25, moves backward along the track 26 until it drops into the notch 28. The door is then released and is held in the brace in the sloping position shown in full lines in Fig. 1.

When it is desired to close the door from this position the door is raised slightly to take its weight off the brace lug 24 and the latter is raised and held up momentarily while the door is swung downward so that it will move forward and beyond the notch 28 and thence slide forward along the track 26 as the door is lowered further to the closed position.

When the truck is backed up against a platform, the door is swung outward and upward until it reaches the upper position indicated in dotted lines in Fig. 1, which causes the brace lug 24 to pass the notch 28 and move back to the rear end of the track 26.

In this position the guide flanges 39 are in line with the passages 40 and the door is then pushed forward into the truck body along the plane of the hinge pin tracks 18.

As the door moves forward, the inside guide wheels 29 act to prevent the upper end of the door from sticking against the inner sides of the hinge pin tracks 18 and the outside guide rollers 32 serve to prevent the guide flanges 39 from binding in the passages 40.

The conical faces of these rollers prevent the door from being raised too high and rubbing against the top of the door opening. The flanges of the angle irons 39 which bear against the guides 32 also serve to support the weight of the lower or rear end of the door when it is pushed forward into the position shown in Fig. 3.

During the forward motion of the door, the brace lug 24 moves forward along the track 26, and it is necessary to lift it momentarily so that it will not drop into the notch 28.

The hinge pins 17 move forward in the tracks 18 and pass over the humps 19 just before the door reaches the fully retracted position shown in Fig. 3. These humps serve to keep the door from sliding back along the tracks 18, and the operator can release his hold on the door. If desired the spring hook 37 may be inserted in the eye bolt 36 to hold the door positively in place. The door may be kept open in hot weather by this spring to provide necessary ventilation of the truck body.

The retracted door occupies a very small space at the top of the rear end of the truck and lading can be packed therein as far back as the rear of the truck body and up to just clear of the underside of the door for the full width of the body, leaving only room at one side for the sliding movement of the brace rod 21.

By releasing the spring hook 37 the door is freed and a slight rearward pull causes hinge pins 17 to repass the humps 19 in the tracks 18 and the door to start backward and rearward along the tracks. At the same time the brace lug 24 moves back along the track 26. When the door is fully extended, the hinge pins 17 engage the rear ends of the tracks 18 and the door is swung downward and inward, the brace lug 24 being lifted momentarily to prevent it from lodging in the notch 28 as before.

The angle iron 31 serves to reinforce the rear end of the body immediataely above the door 15. It also carries the two depending guide devices 32 and serves as a watershed or shelf above the door. The side angle irons 39 reinforce the door and serve to take up the lateral wear against the guides 32. The side tracks 18 and 26 serve to reinforce the sides of the body of the vehicle as well as serving as guides for the sliding door 15 and the brace 21. The lower edge of the door is reinforced by the angle irons 33 and 34 which also serve to keep out water. These features of reinforcement and protection against the entrance of water are quite important in vehicles of this type in view of the severe conditions of use and the necessity of protecting the contents of the vehicle from the weather.

It will thus be seen that my improved device is practical and inexpensive to construct requires a minimum of space within the truck body when retracted, makes it possible to handle lading between a platform and the truck without any obstruction of the passage space at the rear of the truck, provides for ventilation in hot weather, gives full protection to lading in transit during inclement weather, is easy to operate and can be used as an extending shed to protect the lading and the operator when the latter is on the ground at the rear of the truck.

I claim:

1. In combination with a vehicle body having sides, an inclined guide rail secured to each side, an end door, hinge pins projecting from said door into said guide rails, a brace hinged at one end to the approximate center of one side of said door, a lug on the other end of said brace, a horizontal track on the side of said vehicle body adjacent said brace formed to allow longitudinal passage of said lug and having a recess to receive said lug near the rear end of the track to hold the door in a raised position.

2. In combination with a vehicle body having sides, an inclined guide rail secured to each side having slightly raised portions near their upper ends and stops at their lower ends, an end door, hinge pins projecting from said door into said guide rails, rollers carried by said door positioned to bear against the inner faces of said rails, a brace hinged at one end to one side of the inner face of said door, a lug on the other end of said brace, a horizontal track on the side of said vehicle body adjacent said brace formed to allow longitudinal passage of said lug and having a recess to receive said lug in one position thereof and means for holding said door in a retracted position.

3. In combination with a vehicle body having sides and top, a fixed end member between said sides adjacent said top, an outwardly projecting transverse shelf at the lower edge of said end member, an upwardly and inwardly inclined guide rail secured to each side having slightly raised portions near their upper ends and stops at their lower ends, an end door, hinge pins projecting from the upper outer corners of said door into said guide rails, rollers carried by said door positioned to bear against the inner faces of said rails, a brace hinged at one end to one side of the inner face of said door, a lug on the other end of said brace, a horizontal track on the side of said vehicle body adjacent said brace formed to allow longitudinal passage of said lug laterally extending flanges on the outer side edges of said door, and vertical rollers carried by said shelf positioned to engage said flanges.

4. A vehicle body open at the rear, a reinforcing shelf extending across the body at the rear of the upper edge of the rear opening, lateral guides depending from opposite ends of said shelf, tracks supported by the side walls of the vehicle body and extending forwardly and having bearings adjacent said guides, a door having projecting pivot pins at its upper end mounted to slide in said tracks beneath said shelf and adapted to rotate in said bearings, said door being adapted to be swung upwardly around said pins and adapted to be slid inwardly along said tracks and guided between said depending guides, and a brace hinged to a lower portion of the door and adapted to hold the door in an inclined raised position.

5. A vehicle body open at the rear, tracks extending forwardly from the rear opening at opposite sides of the vehicle body, a door having hinge pins at its upper edge traveling in said tracks, angle irons extending along opposite edges of said door having flanges extending laterally therefrom, means coacting with said flanges and serving to support the door when it is raised and slid forwardly into the body and a guide for each edge of the door at a point spaced apart from a hinge pin.

6. A vehicle body open at the rear and having guides at opposite sides at the upper end of the rear opening, said guides having tapered upper portions, tracks mounted in the body and extending forwardly from said guides and a door having hinge pins supported to rotate and to slide in said tracks and having side flanges coacting with said guides when the door is raised and slid inwardly into the body.

7. A vehicle body having an opening in the rear with vertical posts at opposite sides of the opening, guide plates secured to the opposite inner side walls near the top and having their rear ends located adjacent the upper end of said opening, guide rollers secured to the rear of said body adjacent the opposite upper corners of said opening, a door having hinge pins supported to rotate and to slide in said guide plates and having angle irons with flanges secured to the sides edges of the door and other flanges parallel to the general plane of the door, said latter flanges abutting against said posts when the door is closed and adapted to coact with said guide rollers when the door is raised and slid inwardly on the guide plates and guide rollers carried by the upper part of the door at the inner face thereof for coacting with the guide plates and a brace rod to hold the door in elevated position.

MORRIS LASSINSKY.